United States Patent [19]

Humphrey et al.

[11] Patent Number: 5,530,057
[45] Date of Patent: Jun. 25, 1996

[54] FILLED ALIPHATIC THERMOPLASTIC URETHANE AUTOMOTIVE AIR BAG DOOR TEAR SEAM INSERT

[75] Inventors: William M. Humphrey, Dover; Eugene P. Shope, Barrington; Donald B. Preston, Somersworth, all of N.H.

[73] Assignee: Davidson Textron Inc., Dover, N.H.

[21] Appl. No.: 465,511

[22] Filed: Jun. 5, 1995

[51] Int. Cl.⁶ .............................. C08J 3/00; C08K 3/20; C08K 3/30; C08L 75/00
[52] U.S. Cl. .................. 524/589; 523/218; 523/219; 524/423; 524/442; 524/444; 524/450; 524/590; 528/44
[58] Field of Search .................... 524/423, 442, 524/444, 450, 589, 590; 523/218, 219; 528/44

[56] References Cited

U.S. PATENT DOCUMENTS

| | | | |
|---|---|---|---|
| 5,222,760 | 6/1993 | Rafferty | 280/728 |
| 5,288,103 | 2/1994 | Parker et al. | 280/728 |
| 5,302,634 | 4/1994 | Mushovic | 523/218 |
| 5,418,257 | 5/1995 | Weisman | 521/54 |

Primary Examiner—Paul R. Michl
Assistant Examiner—Patrick Niland
Attorney, Agent, or Firm—Reising, Ethington, Barnard & Perry

[57] ABSTRACT

A filled aliphatic thermoplastic urethane automotive air bag door tear seam insert is formed of a polyol, a chain extender, an organic diisocyanate, an antioxidant, a urethane catalyst, and a weakening filler wherein the filler is present in a range of approximately 60% to 80% by weight and is selected from the group consisting of anhydrous calcium sulfate, nepheline syenite and hollow silica-alumina alloy microspheres and combinations thereof. The filler may be only one of the group members or any combination thereof and in either equal or unequal proportions. The insert is adapted to be molded in place in a cover skin cast there about. The cast cover skin including the tear seam insert may be coated with a light stable paint; or for light stability and color matching, the urethane elastomer forming the cover skin and insert is formulated to include an ultra violet stabilizing agent(s) and a color pigment(s) in certain critical concentrations to obtain the desired effect.

29 Claims, No Drawings

FILLED ALIPHATIC THERMOPLASTIC URETHANE AUTOMOTIVE AIR BAG DOOR TEAR SEAM INSERT

TECHNICAL FIELD OF THE INVENTION

The present invention relates generally to automotive air bag door tear seams and, more specifically, to a tear seam insert made from a filled aliphatic urethane elastomer.

BACKGROUND OF THE INVENTION

Present passenger side air bag doors are commonly separate parts from the air bag cover portion of the instrument panel and have a skin (also called a "shell") typically made from polyvinyl chloride (PVC) or sprayable aliphatic urethane elastomer with urethane foam as an intermediate layer and a metal or plastic substrate and also made with injection molded polyolefin elastomers that are painted. The separate doors have however created problems regarding proper fit of the doors, color match of the door and in some cases the low and high temperature performance limits of the door. One approach to eliminating such door problems is to form the door integral with the air bag cover skin wherein the door is defined by either a visible or hidden ("invisible") tear seam formed by a weakening groove in the outer or inner side respectively of the cover skin. Such a tear seam is adapted to be readily torn or fractured by the force of an inflating air bag to create a door opening in the cover skin for air bag deployment. An example of such an invisible tear seam is disclosed in U.S. Pat. No. 5,222,760.

Another approach for providing an invisible air bag door tear seam is to form same in the cover skin with a weakened material as disclosed in U.S. Pat. No. 5,288,103. In the latter patent, the cover skin is made by casting thermoplastic material such as PVC in either a spheroidal particle form of the desired size or a cryogenically ground form onto a heated nickel tool surface having the desired shape and appearance side grain (texture). A section of the casting apparatus presses a gasket having the desired tear seam shape (e.g. a H, U or X-shape) against the tool surface during the casting of the cover skin and forms a tear seam defining opening in the cover skin following fusing thereof and removal of the gasket. The tear seam defining opening in the cover skin is then filled with a lesser strength thermoplastic material such as glass or carbonate filled PVC while the cover skin remains on the heated mold surface to thus form in place an integrally bonded tear seam strip in the cover skin. This produces an invisible tear seam if the filler used and the processing conditions are such that the tear strip that is formed in place on the tool surface has a perfect or near perfect porosity and color match with the cover skin. If not, the cover skin with integral tear seam strip can be painted to provide this effect.

Certain automobile manufactures have prescribed that the elastomer used to make an air bag cover skin with an integral tear seam be capable of providing extremely low temperature performance as well as being capable of meeting certain requirements for withstanding prolonged levels of artificial weathering which simulates exposure to the heat and ultra violet radiation and sunlight. With respect to low temperature performance, it is desired that the cover skin including the tear seam not suffer cold embrittlement and then be prone to fragment or shatter into small pieces when the seam is torn for air bag deployment at a very low temperature. For example, the PVC elastomers presently used are capable of meeting the basic requirements for weathering and providing satisfactory performance with regard to an integral tear seam in the temperature range of about −20° C. to 80° C. but not down to −40° C. or to as high as 100° C. which is now being specified by some automobile manufacturers. A further more specific example is where the cover skin is made with cast PVC particles or powder and the tear seam is made with filled PVC as in the above U.S. Pat. No. 5,288,103 wherein the PVC for the tear seam is filled with 40% by weight water ground calcium carbonate having a mean particle size of 5.5 microns and a particle size distribution that ranges from 0.5 to 50 microns. It was found that the resulting cover skin and formed in place tear seam does provide satisfactory performance with respect to air bag deployment in the temperature range of −17° C. to 76° C. which is generally acceptable by automobile manufactures except for those now requiring a far more extended performance range of −40° C. to 100° C.

On the other hand, there is now known to be a light stable aliphatic thermoplastic urethane elastomer that in addition to meeting the basic requirements of resistance to heat, ultra violet radiation and sunlight, also has the ability to provide satisfactory performance with respect to an integral tear seam strip formed with the same urethane elastomer in the desired temperature range of −40° C. to 100° C.; this particular urethane elastomer exhibiting a glass transition temperature of −55° C. and being disclosed in U.S. patent application Ser. No. 319,614 filed Oct. 7, 1994 entitled "LIGHT STABLE ALIPHATIC THERMOPLASTIC URETHANE ELASTOMERS AND METHOD OF MAKING SAME" and assigned to the assignee of this invention and which is hereby incorporated by reference. However, a suitable weakened or lesser strength thermoplastic material based on such an aliphatic urethane elastomer is not presently known to be available for making an air bag door tear seam that is compatible with conventional casting processing methods for the cover skin.

SUMMARY OF THE INVENTION

The present invention eliminates the presence of thermoplastic urethane spheroidal particles or powder in the formation of the tear seam which was found to pose a problem in obtaining their complete fusing when formed in place on a heated nickel tool surface and is accomplished by the formation of the tear seam as an insert of lesser strength than the cover skin wherein the insert is preformed and made by adding a certain filler in a certain measured quantity to an aliphatic thermoplastic urethane elastomer such as in the above U.S. patent application Ser. No. 319,614 and about which (i.e. the insert) the air bag cover skin can then be integrally cast and fuse with the insert when the cover skin is formed by casting a suitable thermoplastic powder or spheroidal particles on a heated shell tool as disclosed in U.S. patent application Ser. No. 08/465,306 entitled "METHOD AND APPARATUS FOR CASTING A THERMOPLASTIC AIR BAG COVER SKIN WITH A LESSER STRENGTH THERMOPLASTIC TEAR SEAM STRIP INSERT" and assigned to the assignee of this invention and filled concurrently with this application and which is hereby incorporated by reference.

Preferably, the air bag cover skin is cast with the same aliphatic thermoplastic urethane elastomer but without the filler wherein the elastomer is processed for casting of the cover skin in either a spheroidal particle form of a suitable size(s) or the material is glass ground to a powder form. The desired weakness with the urethane elastomer is obtained by processing the above aliphatic thermoplastic urethane elastomer with an added filler that is present in a range of 60% to 80% by weight and is selected from the group consisting of anhydrous calcium sulfate, nepheline syenite and hollow silica-alumina alloy microspheres. The filler material may be only one of the members of this group or it may be any combination thereof and in either equal or unequal proportions.

The filled aliphatic urethane material is processed into either sheets or profiles that are then die cut to produce a prescribed tear seam profile which may for example be a H, U or X-shape as earlier mentioned and wherein the insert has a substantially homogeneous solid form with limited porosity closely matching that of the cover skin when the latter is formed with the same urethane elastomer using conventional powder or spheroidal particle casting methods. Furthermore, the ultra violet stabilizing agent(s) and color pigment(s) may be omitted from the aliphatic thermoplastic elastomer where the cover skin including the tear seam insert are coated with a suitable light stable paint.

It is therefore an object of the present invention to provide a new and improved tear seam for an air bag cover.

Another object is to provide a tear seam insert made with an aliphatic thermoplastic urethane elastomer and a filler material that allows the tear seam insert to perform satisfactorily in an air bag cover skin at extremely low temperatures.

Another object is to provide an essentially homogeneous solid tear seam insert made with an aliphatic thermoplastic urethane elastomer and a filler material that allows the tear seam insert to perform satisfactorily in an air bag cover skin at temperatures as low as −40° C. and as high as 100° C.

Another object is to provide a tear seam insert made with a material formed from an aliphatic thermoplastic elastomer and a filler selected from the group consisting of anhydrous calcium sulfate, nepheline syenite and hollow silica-alumina alloy microspheres wherein the filler is present in a range of 60% to 80% by weight and the filler may be only one of the group members or any combination thereof and in either equal or unequal proportions.

These and other objects, advantages and features of the present invention will become more apparent from the following detailed description.

DETAILED DESCRIPTION OF THE INVENTION

The invention utilizes a light stable aliphatic thermoplastic elastomer and the method of making same as disclosed in detail in the aforementioned U.S. patent application Ser. No. 319,614. This elastomer basically comprises the reaction product of a polyol, a chain extender, an organic diisocyanate, at least one ultra violet stabilizing agent, at least one antioxidant and at least one color pigment and wherein the ultra violet stabilizing agent(s), the antioxidant(s) and the pigment(s) are present in certain critical concentrations to obtain excellent weathering resistance and wherein the elastomer is suited to making an air bag cover skin and a tear seam that can perform satisfactorily in the desired range of −40° C. to 100° C. provided the elastomer material forming the tear seam is sufficiently weakened and can be included in the casting of the cover skin in an efficient effective manner. The present invention accomplishes this with both the selection of a specific filler found through testing to be suitable and processing of the filled aliphatic thermoplastic urethane elastomer into an insert that can used in the casting of the cover skin with excellent results.

The tear seam insert of the present invention may have the shape of any one of the forms of a conventional tear seam such as H, U or X-shape or some other suitable shape and is made from a filled aliphatic thermoplastic urethane elastomer wherein a certain critical filler is added in a certain critical amount to the urethane elastomer disclosed in the above U.S. patent application Ser. No. 319,614. The filler comprises either anhydrous calcium sulfate, nepheline syenite or hollow silica-alumina alloy microspheres or any combination thereof in either equal or unequal amount and is provided in a limited range of 60% to 80% by weight with percentages above the higher level of 80% having been found to promote even greater weakness in the insert which may be desirable but prevents sufficient heating of the tear seam insert by the heated tool surface for its fusing with the cover skin being formed on this tool surface. On the other hand, percentages of the filler below the lower level of 60% were found to exhibit substantial loss of elongation and the desired weakness in the tear seam.

The filled aliphatic thermoplastic urethane elastomer for forming the tear seam insert of the present invention may be made in a "one-shot" reaction process. The "one-shot" technique involves mixing, in a suitable container, polyol, chain extender, organic diisocyanate, ultra violet stabilizing agent(s), antioxidant, pigment(s), urethane catalyst and filler as described above, and then agitating the mixture for approximately 20 to 30 seconds. The elastomer can also be made by preblending a portion of the polyol, the antioxidant, catalyst and UV/heat stabilizers. The blend is added to an agitated, heated tank of a urethane casting machine; isocyanate is placed into a separate agitated, heated tank; chain extender/crosslinker is placed into a third tank; and pigment masterbatch with the additional polyol is added at the mixhead. The components are metered individually using gear pumps or other pumps with the required metering accuracy, with suitable flow control devices, to a low pressure mixhead for blending. The mixture from the mixing head of the urethane casting machine is used as the feed for a two roll mill or twin screw extruder to yield either sheets or profiles of light stable filled aliphatic thermoplastic urethane elastomer. Tear seam inserts are then die cut to the desired tear seam shape from this sheet or profile stock; such tear seam forming pieces being referred to herein as tear seam inserts as they are preformed and inserted and held against the heated nickel tool surface on which the cover skin is cast with thermoplastic particles or powder and wherein the insert and cast cover skin fuse together on the heated tool surface while the cover skin forms in the casting thereof and the insert essentially retains its shape and thus its physical integrity in the casting process.

The composition of the light stable aliphatic urethane elastomer apart from the filler and the method for making same and examples thereof are disclosed in detail in the aforementioned U.S. patent application Ser. No. 319,614 and reference is made thereto for further details including the formation of particles or powder from the elastomer for casting an automotive interior panel skin and apart from the addition of any weakening filler to the elastomer. And it will be further understood that where the cover skin including the filled aliphatic thermoplastic urethane tear seam insert are to be painted with a suitable coating that provides the required resistance to ultra violet radiation and sunlight and hides the presence of the tear seam insert, the ultra violet stabilizing agent(s) and color pigment(s) may be omitted from the urethane elastomer in the processing thereof.

Apparatus and method for inserting and holding the tear seam insert of the present invention are disclosed in detail in the aforementioned U.S. patent application Ser. No. 08/465,306. And reference is made thereto for the details of how the tear seam insert of the present invention is inserted in the casting of the cover skin.

EXAMPLES

Regarding the filler, the anhydrous calcium sulfate may for example be CAS-20-4 available from U.S. Gypsum Co. wherein such material has an average particle size of 4.0 microns and a maximum size of 20 microns. The nepheline syenite may for example be Minex 7 available from Unimin Specialty Minerals Co. wherein such material has a median particle size of 3.9 microns. And the hollow silica-alumina alloy microspheres may for example be Zeeospheres 400 or 600 or 800 available from Zeelan Industries wherein such material has an average particle size of 1.6, 1.8 and 3.0 microns respectively and a maximum size of 24, 44 and 225 microns respectively. The filler may consist of only one of these filler materials or be any combination thereof in either equal or unequal proportions. With regard to the latter, the filler material may thus be the combination of the above anhydrous calcium sulfate, nepheline syenite and hollow silica-alumina alloy microspheres in equal or unequal proportions; or the above anhydrous calcium sulfate and nepheline syenite in equal or unequal proportions; or the above nepheline syenite and hollow silica-alumina alloy microspheres in equal or unequal proportions.

Filled aliphatic thermoplastic urethane tear seam insert samples, made in accordance with the present invention, wherein the samples had a uniform thickness of 0.030 inches and 80% by weight of the example fillers described above, were inserted one at a time onto a cover skin casting nickel tool surface at the same time that a cryogenically ground powder of the same urethane elastomer, but without the filler and for forming the cover skin, was cast onto the tool surface which had been previously heated to about 224° C. Reference the aforementioned U.S. patent application Ser. No. 08/465,306. It was found that there was sufficient heat in the tool to melt the urethane elastomer in the insert samples sufficiently to completely fuse with the cover skin being formed there about on the tool surface in the casting process even at a filler level of 80%. And it was further found that the tear seams thus formed from these inserts exhibited the desired brittle but not shattering fracture. It was further found that this could not be done with the same filled elastomer when applied in powder or spheroidal particle form to the heated tool surface in an attempt to form the tear seam in place as there resulted unmelted powder and particles in the tear seam area. It was also found that with similar insert samples but having filler percentages above 80%, the tear seam formed by the samples was further weakened which could be desirable for air bag deployment provided adequate strength is maintained in the cover skin at the tear seam but the increased filler substantially inhibits the heat of the tool surface in adequately fusing the insert in place in the cover skin and can create undesired discernable porosity in the insert. On the other hand, it was found from similar sample inserts but with filler percentages below 60%, the tear seam insert was not significantly weakened and it is believed that the filler may actually act as a reinforcement for the urethane elastomer. However, it was found from similar sample inserts but with 60% filler, these inserts started to exhibit substantial loss of elongation and the desired brittle but not shattering fracture.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described.

What is claimed is:

1. A filled aliphatic thermoplastic urethane automotive air bag door tear seam insert for forming a tear seam in an air bag cover skin formed there about, said tear seam insert comprising:
   (a) a polyol;
   (b) a chain extender;
   (c) an organic diisocyanate;
   (d) an antioxidant;
   (e) a urethane catalyst;
   (f) a weakening filler; and characterized by
   (g) said weakening filler being present in a range of approximately 60% to 80% by weight and selected from the group consisting of anhydrous calcium sulfate, nepheline syenite and hollow silica-alumina alloy microspheres.

2. The filled aliphatic thermoplastic urethane automotive air bag tear seam insert of claim 1 wherein said anhydrous calcium sulfate has an average particle size of about 4.0 microns and a maximum size of about 20 microns.

3. The filled aliphatic thermoplastic urethane automotive air bag tear seam insert of claim 1 wherein said nepheline syenite has an average particle size of about 3.9 microns.

4. The filled aliphatic thermoplastic urethane automotive air bag tear seam insert of claim 1 wherein said hollow silica-alumina microspheres have an average size of about 1.6 microns and a maximum size of about 24 microns.

5. The filled aliphatic thermoplastic urethane automotive air bag tear seam insert of claim 1 wherein said hollow silica-alumina microspheres have an average size of about 1.8 microns and a maximum size of about 44 microns.

6. The filled aliphatic thermoplastic urethane automotive air bag tear seam insert of claim 1 wherein said hollow silica-alumina microspheres have an average size of about 3.0 microns and a maximum size of about 225 microns.

7. The filled aliphatic thermoplastic urethane automotive air bag tear seam insert of claim 1 wherein said weakening filler comprises a combination of said anhydrous calcium sulfate, said nepheline syenite and said hollow silica-alumina alloy microspheres.

8. The filled aliphatic thermoplastic urethane automotive air bag tear seam insert of claim 1 wherein said weakening filler comprises a combination of said anhydrous calcium sulfate and said nepheline syenite and said hollow silica-alumina alloy microspheres in equal proportions.

9. The filled aliphatic thermoplastic urethane automotive air bag tear seam insert of claim 1 wherein said weakening filler comprises a combination of said anhydrous calcium sulfate and said nepheline syenite and said hollow silica-alumina alloy microspheres in unequal proportions.

10. The filled aliphatic thermoplastic urethane automotive air bag tear seam insert of claim 1 wherein said weakening filler comprises a combination of said anhydrous calcium sulfate and said nepheline syenite.

11. The filled aliphatic thermoplastic urethane automotive air bag tear seam insert of claim 1 wherein said weakening filler comprises a combination of said anhydrous calcium sulfate and said nepheline syenite in equal proportions.

12. The filled aliphatic thermoplastic urethane automotive air bag tear seam insert of claim 1 wherein said weakening filler comprises a combination of said anhydrous calcium sulfate and said nepheline syenite in unequal proportions.

13. The filled aliphatic thermoplastic urethane automotive air bag tear seam insert of claim 1 wherein said weakening filler comprises a combination of said anhydrous calcium sulfate and said hollow silica-alumina alloy microspheres.

14. The filled aliphatic thermoplastic urethane automotive air bag tear seam insert of claim 1 wherein said weakening filler comprises a combination of said anhydrous calcium sulfate and said hollow silica-alumina alloy microspheres in equal proportions.

15. The filled aliphatic thermoplastic urethane automotive air bag tear seam insert of claim 1 wherein said weakening filler comprises a combination of said anhydrous calcium sulfate and said hollow silica-alumina alloy microspheres in unequal proportions.

16. The filled aliphatic thermoplastic urethane automotive air bag tear seam insert of claim 1 wherein said weakening filler comprises a combination of said nepheline syenite and said hollow silica-alumina alloy microspheres.

17. The filled aliphatic thermoplastic urethane automotive air bag tear seam insert of claim 1 wherein said weakening filler comprises a combination of said nepheline syenite and said hollow silica-alumina alloy microspheres in equal proportions.

18. The filled aliphatic thermoplastic urethane automotive air bag tear seam insert of claim 1 wherein said weakening filler comprises a combination of said nepheline syenite and said hollow silica-alumina alloy microspheres in unequal proportions.

19. The filled aliphatic thermoplastic urethane automotive air bag tear seam insert of claim 1 wherein said weakening filler comprises a combination of said anhydrous calcium sulfate and said nepheline syenite and said hollow silica-alumina alloy microspheres, said anhydrous calcium sulfate has an average particle size of about 4.0 microns and a maximum size of about 20 microns, said nepheline syenite has an average particle size of about 3.9 microns, and said hollow silica-alumina microspheres have an average size of about 1.6 microns and a maximum size of about 24 microns.

20. The filled aliphatic thermoplastic urethane automotive air bag tear seam insert of claim 1 wherein said weakening filler comprises a combination of said anhydrous calcium sulfate and said nepheline syenite and said hollow silica-alumina alloy microspheres, said anhydrous calcium sulfate has an average particle size of about 4.0 microns and a maximum size of about 20 microns, said nepheline syenite has an average particle size of about 3.9 microns, and said hollow silica-alumina microspheres have an average size of about 1.8 microns and a maximum size of about 44 microns.

21. The filled aliphatic thermoplastic urethane automotive air bag tear seam insert of claim 1 wherein said weakening filler comprises a combination of said anhydrous calcium sulfate and said nepheline syenite and said hollow silica-alumina alloy microspheres, said anhydrous calcium sulfate has an average particle size of about 4.0 microns and a maximum size of about 20 microns, said nepheline syenite has an average particle size of about 3.9 microns, and said hollow silica-alumina microspheres have an average size of about 3.0 microns and a maximum size of about 225 microns.

22. The filled aliphatic thermoplastic urethane automotive air bag tear seam insert of claim 1 wherein said weakening filler comprises a combination of said anhydrous calcium sulfate and said nepheline syenite, said anhydrous calcium sulfate has an average particle size of about 4.0 microns and a maximum size of about 20 microns, and said nepheline syenite has an average particle size of about 3.9 microns.

23. The filled aliphatic thermoplastic urethane automotive air bag tear seam insert of claim 1 wherein said weakening filler comprises a combination of said anhydrous calcium sulfate and said hollow silica-alumina alloy microspheres, said anhydrous calcium sulfate has an average particle size of about 4.0 microns and a maximum size of about 20 microns, and said hollow silica-alumina microspheres have an average size of about 1.6 microns and a maximum size of about 24 microns.

24. The filled aliphatic thermoplastic urethane automotive air bag tear seam insert of claim 1 wherein said weakening filler comprises a combination of said anhydrous calcium sulfate and said hollow silica-alumina alloy microspheres, said anhydrous calcium sulfate has an average particle size of about 4.0 microns and a maximum size of about 20 microns, and said hollow silica-alumina microspheres have an average size of about 1.8 microns and a maximum size of about 44 microns.

25. The filled aliphatic thermoplastic urethane automotive air bag tear seam insert of claim 1 wherein said weakening filler comprises a combination of said anhydrous calcium sulfate and said hollow silica-alumina alloy microspheres, said anhydrous calcium sulfate has an average particle size of about 4.0 microns and a maximum size of about 20 microns, and said hollow silica-alumina microspheres have an average size of about 3.0 microns and a maximum size of about 225 microns.

26. The filled aliphatic thermoplastic urethane automotive air bag tear seam insert of claim 1 wherein said weakening filler comprises a combination of said nepheline syenite and said hollow silica-alumina alloy microspheres, said nepheline syenite has an average particle size of about 3.9 microns, and said hollow silica-alumina microspheres have an average size of about 1.6 microns and a maximum size of about 24 microns.

27. The filled aliphatic thermoplastic urethane automotive air bag tear seam insert of claim 1 wherein said weakening filler comprises a combination of said nepheline syenite and said hollow silica-alumina alloy microspheres, said nepheline syenite has an average particle size of about 3.9 microns, and said hollow silica-alumina microspheres have an average size of about 1.8 microns and a maximum size of about 44 microns.

28. The filled aliphatic thermoplastic urethane automotive air bag tear seam insert of claim 1 wherein said weakening filler comprises a combination of said nepheline syenite and said hollow silica-alumina alloy microspheres, said nepheline syenite has an average particle size of about 3.9 microns, and said hollow silica-alumina microspheres have an average size of about 3.0 microns and a maximum size of about 225 microns.

29. The filled aliphatic thermoplastic urethane automotive air bag tear seam insert of claim 1 wherein said insert further comprises at least one ultra violet stabilizing agent and at least one color pigment in concentrations adapted to match the light stability and color of said insert with that of said cover skin.

* * * * *